(12) United States Patent
Fukada

(10) Patent No.: US 12,182,194 B2
(45) Date of Patent: Dec. 31, 2024

(54) INFORMATION PROCESSING APPARATUS, CONTROL METHOD OF INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Masanori Fukada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 700 days.

(21) Appl. No.: 17/338,403

(22) Filed: Jun. 3, 2021

(65) Prior Publication Data
US 2021/0382931 A1 Dec. 9, 2021

(30) Foreign Application Priority Data
Jun. 8, 2020 (JP) .................. 2020-099615

(51) Int. Cl.
*G06F 16/438* (2019.01)
*G06F 16/51* (2019.01)
*G06F 16/58* (2019.01)
*G06F 16/583* (2019.01)

(52) U.S. Cl.
CPC .......... *G06F 16/4393* (2019.01); *G06F 16/51* (2019.01); *G06F 16/583* (2019.01); *G06F 16/5866* (2019.01)

(58) Field of Classification Search
CPC .... G06F 16/4393; G06F 16/51; G06F 16/583; G06F 16/5866
See application file for complete search history.

(56) References Cited

U.S. PATENT DOCUMENTS

| | | | |
|---|---|---|---|
| 11,361,402 B2* | 6/2022 | Jung | H04N 19/132 |
| 2015/0149908 A1* | 5/2015 | Lee | G11B 27/322 715/730 |
| 2016/0232939 A1* | 8/2016 | Malamal Vadakital | G11B 27/309 |
| 2018/0335901 A1* | 11/2018 | Manzari | G06F 3/04883 |
| 2021/0160587 A1* | 5/2021 | Aksu | H04N 21/4342 |
| 2023/0104640 A1* | 4/2023 | Shiina | G06F 16/583 707/825 |

FOREIGN PATENT DOCUMENTS

WO 2019/193097 A1 10/2019

* cited by examiner

*Primary Examiner* — Phuoc Tran
(74) *Attorney, Agent, or Firm* — Canon U.S.A., Inc. IP Division

(57) ABSTRACT

An information processing apparatus determines whether or not one or more image groups for which it is necessary to perform predetermined display in a case where display is performed on a display unit are stored in an image file, selects, in a case where it is determined that one or more such image groups are stored in the image file, (i) a representative image or (ii) an image group of the stored one or more image group based on a user operation, and causes the display unit to display the selected representative image or images included in the selected image group.

20 Claims, 9 Drawing Sheets

FIG. 5

```
aligned(8) class EntityToGroupBox(grouping_type, version, flags)     501
    extends FullBox(grouping_type, version, flags) {
        unsigned int(32) group_id;                                    502
        unsigned int(32) num_entities_in_group;
        for(i=0; i<num_entities_in_group; i++)
            unsigned int(32) entity_id;                               503
        // the remaining data may be specified for a particular grouping_type
}
```

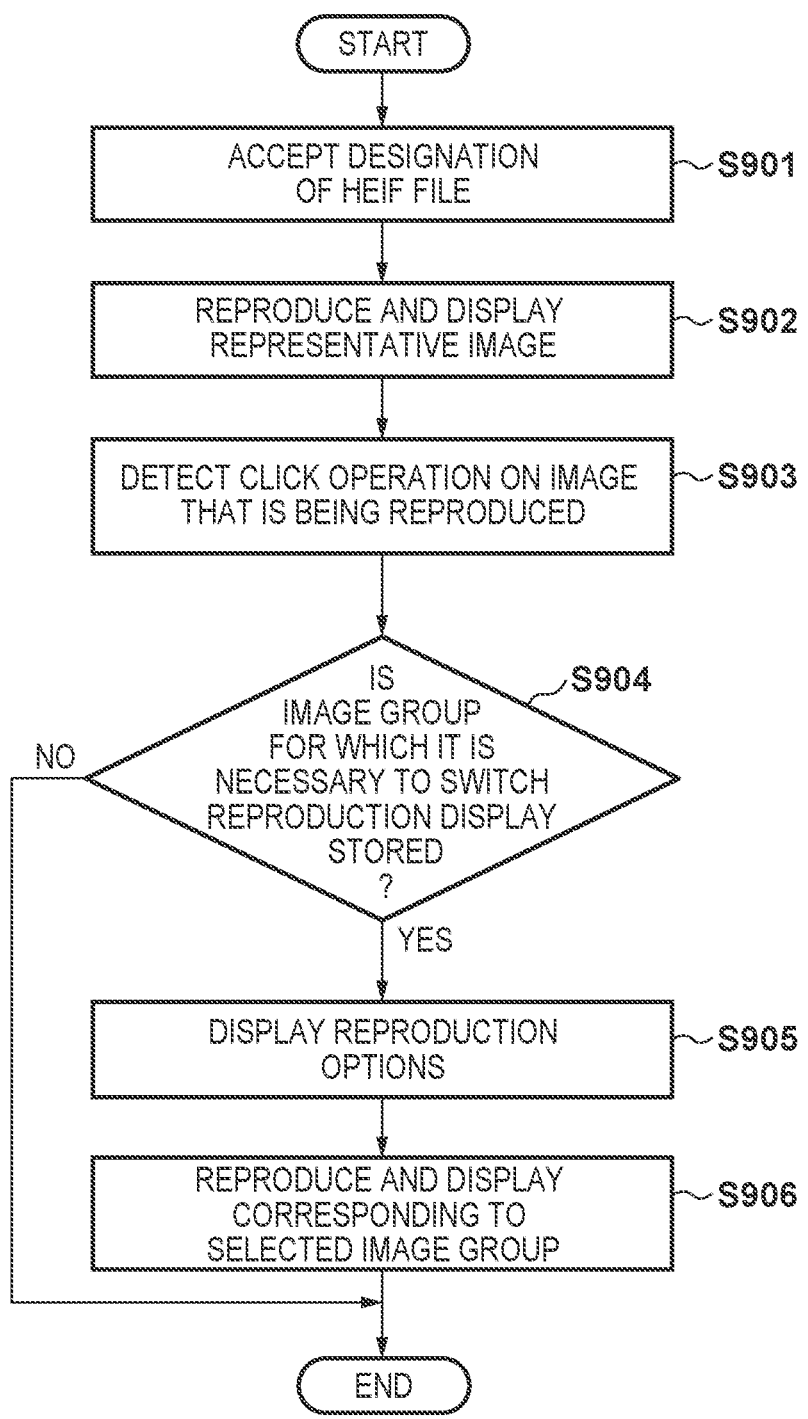

INFORMATION PROCESSING APPARATUS, CONTROL METHOD OF INFORMATION PROCESSING APPARATUS, AND NON-TRANSITORY COMPUTER-READABLE STORAGE MEDIUM

BACKGROUND

Field

The present disclosure relates to a technique for reproducing an image file in which data of one or more images is stored.

Description of the Related Art

In MPEG (Moving Pictures Experts Group), standardization is performed to store a single still image, a plurality of still images, or an image sequence (such as still image burst) into one file. This standard is referred to as a HEIF (High Efficiency Image File Format) standard, and allows images and image sequences to be exchanged, edited, and displayed. Also, HEIF is a storage format expanded on the basis of tools defined by an ISO Base Media File Format (ISOBMFF). In HEIF, standardization is in progress under the name of "Image File Format" in ISO/IEC23008-12 (Part12). Also, HEIF defines a normative structure including metadata, and also defines a method of associating metadata with an image, and a configuration of metadata in a specific format.

Meanwhile, recent image generation apparatuses with an image generation function such as cameras or smartphones have various functions, and can generate various type of information including not only shooting date, image size, and image quality, but also information at the time of shooting, metadata of shot image data, and so on. For example, information for identifying a subject or a scene at the time of shooting, various types of shooting configuration information, and so on are generated together with image data. Also, a mode for organizing shot images or generating an image group is also provided. A user can generate an image group to identify a set of images of his or her choice, or a set of images that correspond to his or her specific interest. An image group may be, for example, a group of suitable type of images, or an image sequence, or both of them. An image shot by a camera is stored in a storage device such as a memory card, for example. An image is typically coded so that the size of data on the storage device is reduced. Many coding standards such as JPEG and HEVC standards can be used. Such information regarding image data can be stored as metadata in a HEIF file together with the image data. Also, it is possible to store a plurality of images and the like as a group in a HEIF file, and store an identifier that allows a user's purpose or the like at the time of file generation and editing to be identified when the file is read out. International Publication No. 2019/193097 discloses a method for storing a plurality of images (image data) shot by bracketing in one HEIF file.

In HEIF, it is also possible to generate an image file that stores a plurality of images and is intended to be used in slide show display. In Technology under Consideration on ISO/IEC 23008-12(w18819), it is reviewed to store, as an image group, metadata to be used in slide show display of a plurality of images stored in a HEIF file. It is also possible to store a plurality of images in one HEIF file, and store these images as a group such as an album collection or a favorite collection. In the text of ISO/IEC 23008-12:2017/DAM2 (w18845), it is reviewed to store, as an image group, metadata to be used to store a plurality of images stored in a HEIF file in an album collection or a favorite collection.

In ISO/IEC23008-12, an identifier (identification information) that indicates a first priority image (main image) is stored as metadata in a HEIF file, and this identifier is used to identify the image to be displayed when the file is reproduced, for example. A file that conforms to the HEIF standard must have only one identifier indicating the first priority image. Also, this identifier is defined as being able to designate a single image but not the above-described image group. Therefore, even if a group to be used in slide show display or a group that serves as an image collection is stored, an image designated as the first priority image is to be displayed.

Conventionally, thus, when a group identifier for a plurality of stored images is stored in a HEIF file, there is no clear provisions on whether a first priority image is to be displayed, or an image group is to be displayed. Thus, there is a problem that, even if a group for which specific display is required is stored in a HEIF file, it is not possible to efficiently display the group.

SUMMARY

In various embodiments of the present disclosure, a technique for a display mechanism when an image group is stored in a HEIF file is provided.

According to various embodiments of the present disclosure, there is provided an information processing apparatus that displays, on a display unit, an image included in an image file that conforms to a predetermined image file format, the image file including an image data area for storing an image and a metadata area for storing metadata information regarding the image, the image file including a representative image, the information processing apparatus includes: a determination unit configured to determine whether or not one or more image groups for which it is necessary to perform predetermined display in a case where display is performed on the display unit are stored in the image file; a selecting unit configured to select, in a case where it is determined that one or more such image groups are stored in the image file, (i) the representative image or (ii) an image group of the stored one or more image groups. based on a user operation; and a display control unit configured to cause the display unit to display the selected representative image or images included in the selected image group.

Further features of the present disclosure will become apparent from the following description of exemplary embodiments (with reference to the attached drawings).

BRIEF DESCRIPTION OF THE DRAWINGS

FIG. 5 illustrates a syntax structure of EntityToGroupBox according to one embodiment.

FIG. 9 is a flowchart of image file reproduction processing according to one embodiment.

DESCRIPTION OF THE EMBODIMENTS

Figure 1:
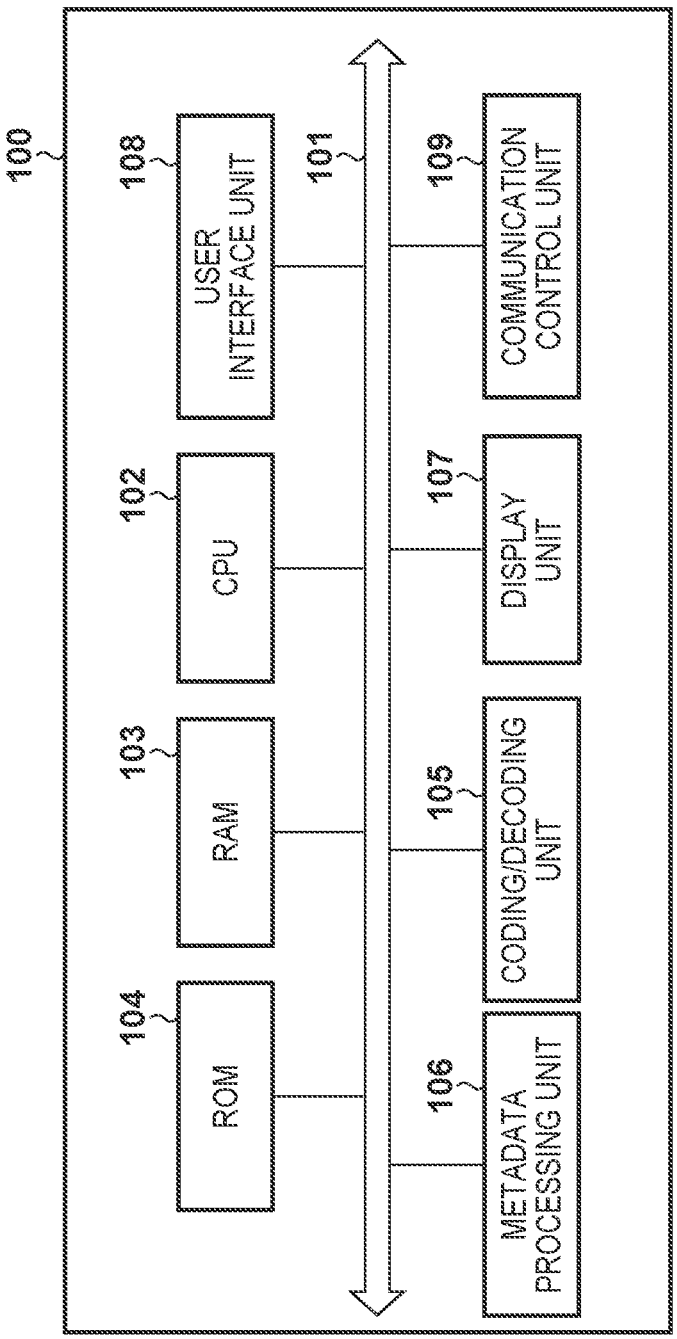
FIG. 1 is a block diagram illustrating a configuration of an information processing apparatus according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiment 1

Configuration of Information Processing Apparatus

FIG. 1 shows an example of a configuration of an information processing apparatus 100 according to the present embodiment. In an information processing apparatus 100, a CPU (Central Processing Unit) 102, a RAM (Random Access Memory) 103, which is a temporary memory used when a system program is executed, and a ROM (Read Only Memory) 104, which is a nonvolatile storage device in which the system program is stored, are connected to a system bus 101. The system program and an application program are read from the ROM 104 to the RAM 103, and are executed by the CPU 102. A coding/decoding unit 105, a metadata processing unit 106, a display unit 107, a user interface unit 108, and a communication control unit 109 are also connected to the system bus 101. The system bus 101 transmits data between these blocks. Also, the RAM 103 includes an output buffer, and is used as a data buffer for slide show display processing, and is also used as an output destination of data to be temporarily saved when metadata of an image file is analyzed. Note that a plurality of CPUs 102, a plurality of RAMs 103, and a plurality of ROMs 104 may also be provided.

The coding/decoding unit 105 is a video codec for moving images and still images conforming to H.265 (HEVC), H.264 (AVC), AV1, JPEG, or the like, and executes processing for coding and decoding still image data and moving image data. The metadata processing unit 106 analyzes metadata (data/information in a metadata area) stored in a file, and performs metadata processing when a still image or a moving image is reproduced. Specifically, the metadata processing unit 106 analyzes metadata as being of an image file stored conforming to a predetermined file format (for example, HEIF), and acquires the metadata (acquires information regarding the still image or the moving image, and acquires parameter information regarding coded data). The coding/decoding unit 105 uses the metadata acquired by the metadata processing unit 106 and the coded data (image data) to decode the data. The metadata processing unit 106 acquires the data (decoded data), stores the data in a buffer, and executes preprocessing for displaying the data. Also, the metadata processing unit 106 performs processing for analyzing the metadata stored in a predetermined image file format.

The display unit 107 performs display processing regarding an application or a function that is executed in the information processing apparatus 100. The display unit 107 is constituted by, for example, a screen such as a liquid crystal display unit, or includes such a screen. Also, the display unit 107 may include a screen touch sensor so as to enable a user to operate an application using a GUI (Graphic User Interface). Also, the display unit 107 may be configured to perform display of options when reproduction is to be performed, or perform display for designating setting information. The user interface unit 108 is an interface for accepting an operation (input) that is made by the user on the information processing apparatus 100. The user interface unit 108 is constituted by a physical operation interface such as a button, a switch, a mouse, a keyboard, and a touch panel, for example.

The communication control unit 109 is a network interface that connects to a network and performs transmission and reception of a transmission frame. The communication control unit 109 is, for example, a PHY and MAC (media access control) of the Ethernet (registered trademark) of a wired LAN. Alternatively, if the information processing apparatus 100 can connect to a wireless LAN, the communication control unit 109 includes a controller that controls a wireless LAN such as IEEE802.11a/b/g/n/ac/ax, an RF circuit, and an antenna.

Flow of Image File Reproduction Processing.

Figure 6:
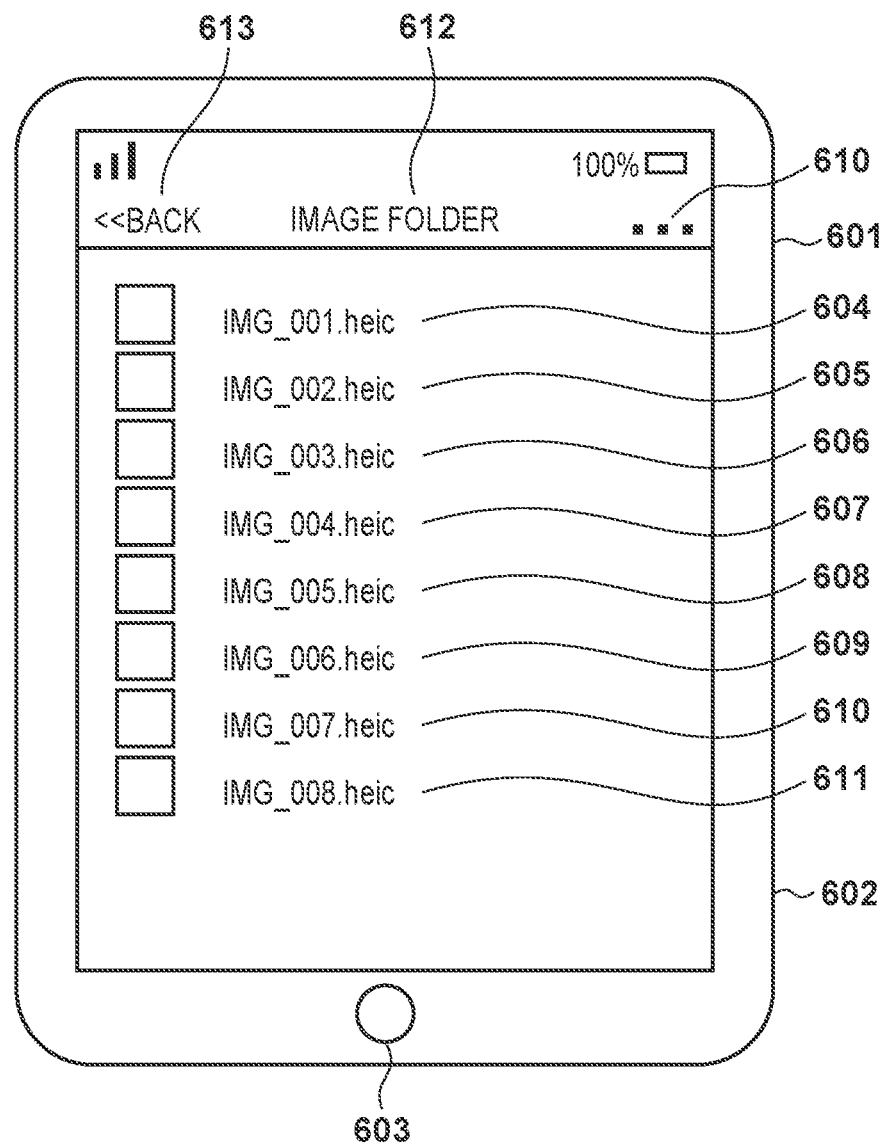
FIG. 6 is a diagram illustrating an example of a display screen of the information processing apparatus according to one embodiment.
Figure 7:
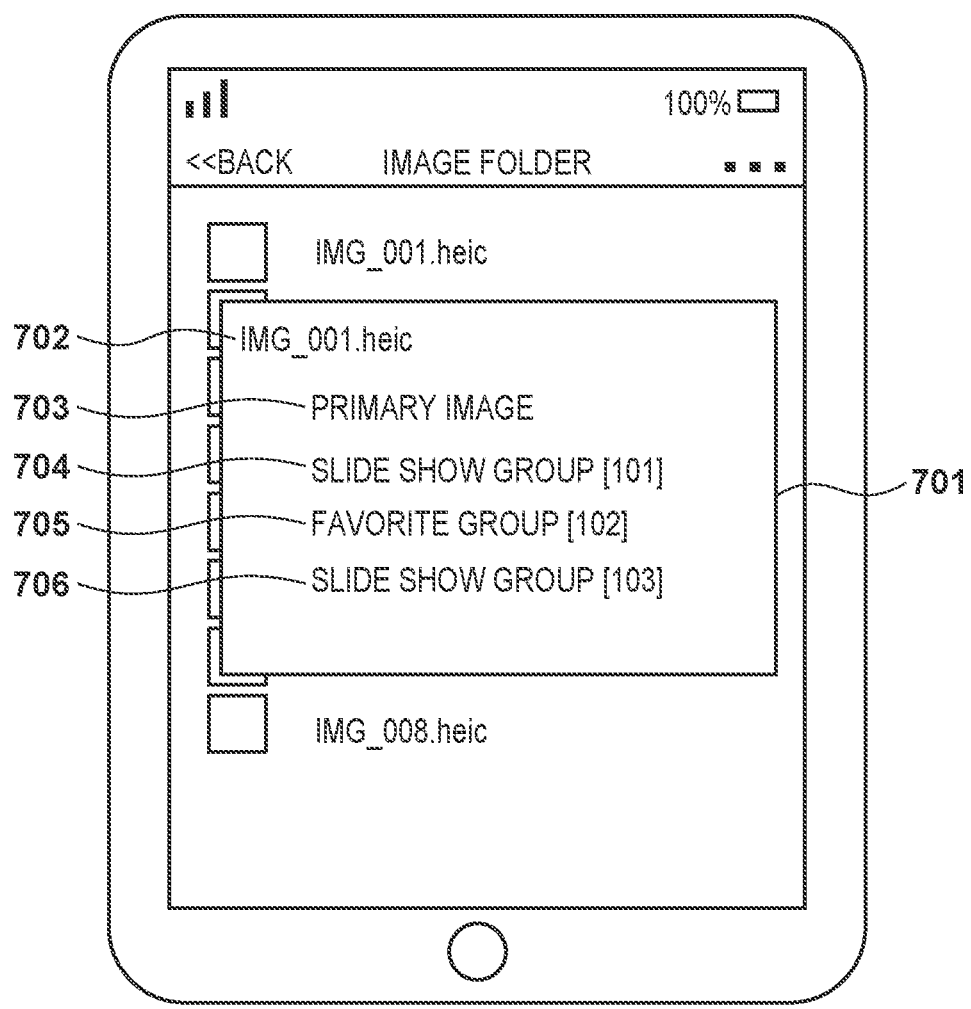
FIG. 7 is a diagram illustrating an example of the display screen of the information processing apparatus according to one embodiment
Figure 8:
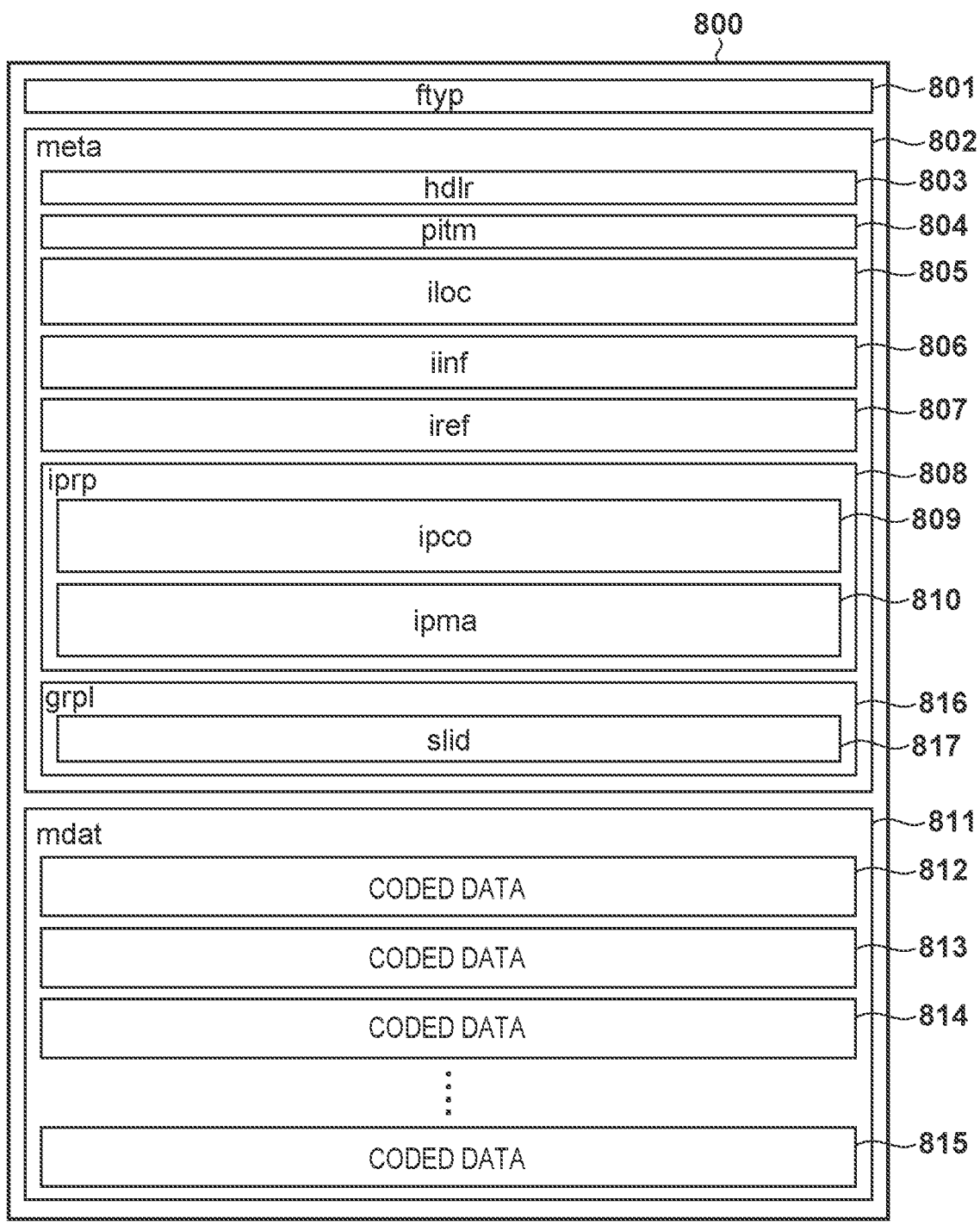
FIG. 8 is a diagram illustrating a structure of an HEW file according to one embodiment.

The following will describe a flow of image file reproduction processing performed by the information processing apparatus 100 with reference to FIGS. 2 to 9. First, a structure of a HEIF file will be described with reference to FIG. 8. FIG. 8 shows a structure of a HEIF file 800, which is an example of an image file conforming to a HEIF file format, out of files to be reproduced and displayed by the information processing apparatus 100 according to the present embodiment. The HEIF file 800 includes a metadata storage area (MetaBox 802 (meta)) (metadata area) and a coded data storage area (MediaDataBox 811 (mdat)) (image data area). The HEIF file 800 also includes a FileTypeBox 801 (ftyp) of a metadata structure that identifies the type of the file. The metadata area may include MovieBox (moov) of a metadata structure that describes several tracks. These tracks describe a series of image samples. The image samples constitute a set of pixels captured at the same time, such as video sequence frames, for example. Pieces of data that correspond to these samples are stored in the MediaDataBox 811 (mdat).

In the HEIF file 800, several single images are described as different items in the MetaBox 802 (meta). The MediaDataBox 811 (mdat) stores pieces of coded image data (for example, coded data 812 to 815) that correspond to these items. The items are defined as entries in an ItemInformationBox 806 (iinf). Specifically, information such as an item ID that serves as an identifier of an item, and an item type that indicates the type of the item are described for each entry. Also, an ItemLocationBox 805 (iloc) that indicates the storage locations of the pieces of coded data that correspond to the items, and an ItemReferenceBox 807 (iref) that indicates the reference relationship between the items are described. Also, in HEIF, a PrimaryItemBox 804 (pitm) is stored as an identifier for indicating a first priority image (main image/representative image). This means that image data with an item_id designated by the PrimaryItemBox 804 (pitm) is the first priority image.

In a HEIF file, a data structure for designating a property associated with an image is defined. More generally, some mechanisms for designating the properties of items (of all types of media) are provided. For example, in the HEIF file 800, an ItemPropertyContainerBox 809 (ipco) is provided in an ItemPropertiesBox 808 (iprp), and properties of items such as image items are stored or described. In an ItemPropertyAssociationBox 810 (ipma), one or more properties are associated with a specific item. Note that it is also possible to associate the same property with a plurality of items. In this case, in order to describe the association between a plurality of items and the properties thereof, a list of property indices in the ItemPropertyContainerBox 809 (ipco) is described in each item identifier (Item_ID).

In the ISOBMFF and HEIF standards, there is a metadata structure in order to enable an item or track to be deal with in a meaningful unit as grouping. The metadata structure is described with a term "entity", so as to refer to an item or track. As a metadata structure for designating grouping of entities, an EntityToGroupBox structure is defined in a GroupListBox.

FIG. 5 illustrates a syntax structure of EntityToGroupBox. A grouping_type 501, which indicates a grouping type, is used to designate the type of grouping. In HEIF, several values for the grouping_type are defined. A grouping_type 'altr' designates an alternative entity for which a different entity can be alternatively used in an application. A grouping_type 'ster' designates that two entities constitute a three-dimensional pair (typically, left and right views) in a stereoscopic viewing application. Also, in Technology under Consideration on ISO/IEC 23008-12 (w18819) and Text of ISO/IEC 23008-12:2017/DAM2 (w18845), other grouping_types are under review. A grouping_type 'brst' indicates that images obtained by burst shooting are listed in the order of shooting and are stored. A grouping_type 'tsyn' indicates image entities shot synchronously with respect to the clock time. A grouping_type 'iaug' indicates that an image and an audio track are associated with each other, and the audio track is reproduced at the same time as image reproduction. A grouping_type 'pano' indicates that listed entities show a panoramic image. Also, grouping_types that correspond to some types of bracket shooting are defined, and, for example, a grouping_type 'aebr' indicates that it is an entity of automatic exposure bracketing shooting. Additionally, definitions of grouping_types are under review such as white balance bracketing shooting, focus bracketing shooting, flash bracketing shooting, and depth bracketing shooting. Also, a grouping_type 'slid' indicates a series of entities that form a slide show. The entities are listed in the order of slide show display and are stored. Also, a grouping_type 'favc' serves as a favorite image collection, and a grouping_type 'albc' serves as an album collection, both indicating groups of images defined by a creator (user) when a file is generated/edited.

A group_id 502 is a unique identifier of an entity group. An entity_id 503 indicates all the entities associated with a group.

Figure 2:
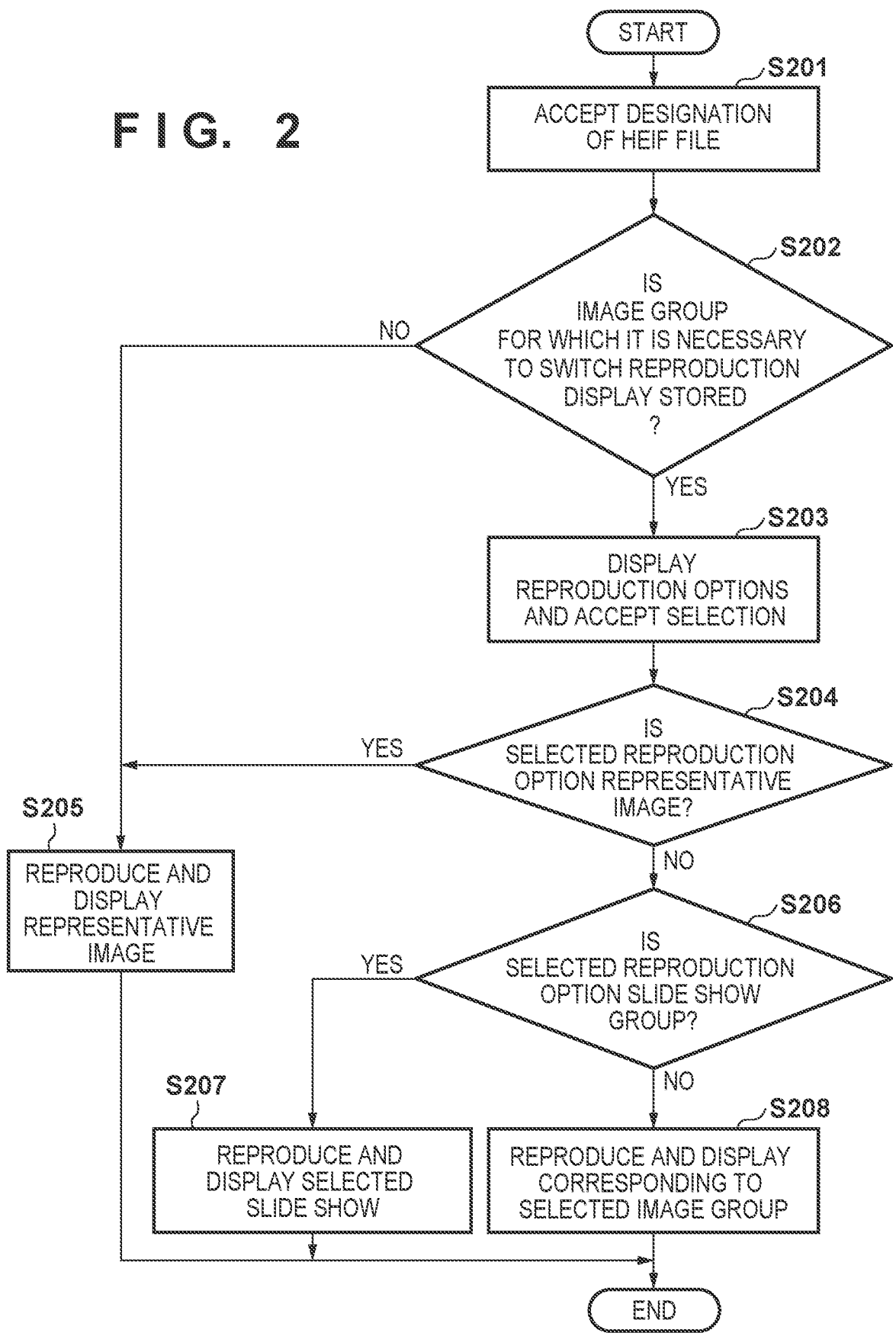
FIG. 2 is a flowchart of image file reproduction processing according to one embodiment.

FIG. 2 shows a flowchart of image file reproduction display processing that is executed by the information processing apparatus 100. Specifically, FIG. 2 shows a flow of processing for reproducing and displaying an image to be reproduced and displayed from a selected HEIF file that conforms to a file format. Each of steps of the flowchart shown in FIG. 2 indicates processing that is executed by one of software by the CPU 102, the coding/decoding unit 105, and the metadata processing unit 106. Note that in the following description, the expression "CPU 102" means software processing that is executed by the CPU 102. Note that in the present description, terms "reproduction display", "reproduction", and "display" mean displaying an image/an image group stored in an image file to reproduce it, and have the same meaning.

The processing for reproducing an image file is such that first in step S201, the CPU 102 accepts designation (selection) of an image file to be reproduced in accordance with a user instruction given via the user interface unit 108 or the like. This may be, for example, direct designation of an image file stored in the RAM 103 or the ROM 104. This may also be, for example, designation of all files stored in a folder stored in the RAM 103 or the ROM 104, designation of all image files whose file generation date is within a specific period of time, or designation using a list or the like for performing reproduction. Also, an image file stored in a specific network folder, cloud, or the like may be designated. In the present embodiment, it is assumed that a HEIF file is designated. The processing for accepting designation may also be performed by the CPU 102 automatically acquiring an image file stored in advance in a predetermined storage location.

Then, in step S202, the metadata processing unit 106 acquires the image file (HEIF file) designated (selected) in step S201, and analyzes metadata stored in this file. Then, the metadata processing unit 106 determines whether or not an image group that is grouped according to a predetermined usage (i.e., an image group for which it is necessary to perform reproduction processing specific for the image group) is stored. This determination may also be performed by the CPU 102. Note that if a plurality of files are designated in step S201, this processing will be performed sequentially for each file. The metadata structure to be analyzed has a file format with the structure exemplified in FIG. 8. First, the metadata processing unit 106 reads out metadata stored in the FileTypeBox 801 (ftyp) and the HandlerBox 803 (hdlr) shown in FIG. 8, and analyzes the metadata. It is conceivable that the handler type of MetaDataBox (meta) that is designated for hdlr of the HEIF file to be analyzed is "pict". Subsequently, the metadata processing unit 106 reads out metadata stored in the MetaBox 802 (meta), and analyzes the metadata. Note that the metadata analyzed here is expanded onto and held by the RAM 103, and is to be used in processing for decoding or displaying image data during image reproduction display in any of steps S205, S207, and S208, together with coded data stored in the MediaDataBox 811 (mdat). The metadata processing unit 106 analyzes whether or not a GroupListBox 816 (grpl) shown in FIG. 8 is stored in the HEIF file. If the GroupListBox 816 (grpl) is stored, the metadata processing unit 106 further checks whether or not an image group that is grouped according to a predetermined usage is stored in this grpl. In the example of FIG. 2, in step S202, the metadata processing unit 106 checks whether or not an image group for which it is necessary to switch reproduction display (image group for which it is necessary (intended) to perform switching display like slide show display) is stored in the grpl. For example, if a SlideshowEntityToGroupBox 817 (slid) is stored in the grpl (the image group is identified with the grouping type 'slid'), the metadata processing unit 106 determines that an image group for which it is necessary to switch reproduction display is stored (Yes in step S202), and determines this image group as a reproduction option, and the processing moves to step S203. Also, if it is determined that an image group identified with the above-described grouping type 'iaug', the grouping type 'favc', or the grouping type 'albc' is stored, the processing may move to step S203. If it is determined that no image group is stored, or an image group for which it is not required to switch reproduction display is stored (No in step S202), the processing moves to step S205.

An image group for which it is not required to switch reproduction display refers to an image group like a panorama shot group, for example. The panorama shot group refers to a set of images that serve as elements for constituting a panorama image. Note that, in the present embodiment, a panorama shot group has been given as an example of an image group for which it is not required to switch reproduction display, but it is also possible to switch between an image group for which it is necessary to switch reproduction display, and an image group for which it is not required to switch reproduction display, based on application processing of the information processing apparatus 100, the settings set or input in advance, or the like. Specifically, if an application for performing processing specialized for panorama shot image processing, such as panorama synthesis, is used, the CPU 102 may deal with a panorama image group as an image group for which it is necessary to switch reproduction display. Also, the CPU 102 may determine whether or not display of a stereo image group needs to be switched, based on whether or not an application that enables stereo display is used.

Alternatively, the CPU 102 may also determine whether or not the image group of the above-described grouping type 'iaug' has settings or an environment in which music reproduction is possible. If the image group of the above-described grouping type 'iaug' has settings or an environment in which music reproduction is not possible, the image group may be subjected to the same processing as in a case where the image group is not stored. The settings or environment in which music reproduction is not possible refers to a case where a manner mode is set for a smartphone, for example. Similarly, the CPU 102 may also be configured to determine whether or not reproduction processing specific for each image group is to be performed, based on an application that performs reproduction processing. For example, if different applications are used to perform reproduction processing in the same information processing apparatus 100, the image group will be different based on which determination of whether or not switching of reproduction display is required is made. This applies not only to application processing, but also to a case where different information processing apparatuses (reproduction processing apparatuses) are used and an image group serving as a reproduction option may be determined for each information processing apparatus.

Also, in the present processing, only an image group is determined as a reproduction target, but a configuration is also possible in which when an image other than the first priority image is stored, this image may also be determined as a reproduction option. For example, if a plurality of images that are not hidden images are stored in the HEIF file, the metadata processing unit 106 may determine the plurality of images as reproduction options. Also, if a plurality of derivative images are included in the HEIF file, the metadata processing unit 106 may determine the images as reproduction options. Accordingly, not only an image group but also an image that is not designated as the first priority image may be determined as a reproduction option.

Then, in step S203, the CPU 102 causes the display unit 107 to display the reproduction options, and accepts selection (designation) made by a user via the user interface unit 108, or the like. The following will describe a mode for displaying reproduction options with reference to FIGS. 6 and 7. FIGS. 6 and 7 are diagrams illustrating examples of a display screen on the display unit 107 of the information processing apparatus 100. FIG. 6 shows a display device 602 such as a liquid crystal display, which serves as an example of the display unit 107, included in a terminal 601 such as a smartphone or a tablet, which serves as an example of the information processing apparatus 100. The display device 602 functions as a touch panel. The display device 602 includes a screen that displays an application, and a screen touch sensor that enables a user to operate the application, and the display device 602 also serves as the user interface unit 108. A button 603 is a physical button, and is a user interface different from the display device 602.

On the display device 602, an "image folder" is shown as a name indication 612 of the currently displayed folder. Also, a virtual button 610 is a virtual button for configuring settings or the like of the displayed application, and a setting screen is displayed by the virtual button 610 being tapped. Also, a virtual button 613 is a virtual button for performing an operation to back to the previous screen. HEIF file names 604 to 611 indicate the names (IMG_001.heic to IMG_008.heic) of HEIF files stored in the image folder.

FIG. 7 shows a screen transitioned from FIG. 6 when one HEIF file has been designated (selected) by a user in step S201 shown in FIG. 2. Specifically, FIG. 7 shows a screen transitioned when the file (IMG_001.heic) of the HEIF file name 604 shown in FIG. 6 has been designated (selected) by a tap operation or the like. Option information 701 in FIG. 7 indicates reproduction options that are displayed in step S203 shown in FIG. 2. In the option information 701, a HEIF file name 702 indicates IMG_001.heic that is the name of the selected HEIF file. Options 703 to 706 indicate images or image groups that are reproduction options and are stored in the IMG_001.heic file. The option 703 ("primary image") indicates a first priority image, and indicates an image with an item_id designated by the PrimaryItemBox (pitm) stored in the HEIF file. The option 704 ("slide show group[101]") indicates a group whose group ID for SlideshowEntityToGroupBox stored in the GroupListBox in the IMG_001.heic file is 101. The option 705 ("favorite group[102]") indicates an image group whose group ID for Favorite Collection entity group 'favc' in the IMG_001.heic file is 102. The option 706 ("slide show group[103]") indicates a group whose group ID for SlideshowEntityToGroupBox is 103. Note that, if a moov box is used to store an image sequence, the image sequence may be displayed as a reproduction option.

First, processing of steps S204 onwards will be described with reference to FIG. 7. In step S204, the CPU 102 checks the option selected (designated) by the user from the options 703 to 706 shown in FIG. 7. If the selected option is the option 703 ("primary image"), which is the representative image (first priority image) (Yes in step S204), the processing moves to step S205. If the selected option is any one of the options 704 to 706 ("slide show group[101]", "favorite group[102]", and "slide show group[103]"), which are image groups (No in step S204), the processing moves to step S206.

In step S205, the information processing apparatus 100 displays, on the display unit 107, image data with the item_id designated by PrimaryItemBox 804 (pitm) stored in the HEIF file. Specifically, first, the metadata processing unit 106 analyzes the type of an image item identified with the item_id designated by the PrimaryItemBox 804 (pitm), based on the information indicated by the ItemInformationBox 806 (iinf). For example, if "hvc1" is designated, it means that the image data is of a HEVC coded image. Then, the metadata processing unit 106 analyzes the ItemReferenceBox 807 (iref) as to whether or not it refers to another item_id, and if the ItemReferenceBox 807 refers to another item_id, the metadata processing unit 106 also analyzes the image item to which it refers. For example, when reference_type is 'dimg', it means that the image data is of a derivative image, and information of the original image from which the image is derived is analyzed and acquired. Note that this information is not used when there is no reference relationship. Then, the metadata processing unit 106 analyzes the ItemLocationBox 805 (iloc), and acquires the storage location of each image data bit stream in the file. Then, the metadata processing unit 106 specifies the location in the MediaDataBox 811 (mdat) at which the data is present, and acquires the corresponding coded data 812 to 815. Also, ItemProperty, which indicates attribute information of an image, is stored in the ItemPropertyContainerBox 809 (ipco) in the ItemPropertiesBox 808 (iprp). Also, an ItemPropertyAssociationBox 810 (ipma), which indicates the relationship between each image item and attribute information thereof, is shown. The image items are sequentially associated with the attribute information in the ipco. By analyzing the metadata, the metadata processing unit 106 acquires the attribute information of the image items. This indicates a HEVC coded parameter if, for example, hvcC is stored in the ItemPropertyContainerBox 809 (ipco). Also, ispe is attribute information indicating the size of an image. Based on the analyzed metadata and the image data, the coding/decoding unit 105 executes decoding processing. The generated decoded data is transferred to the output buffer of the RAM 103, and is saved therein. The CPU 102 instructs the display unit 107 to display the image. The display unit 107 displays the image in accordance with this instruction.

In steps S206, S207, and S208, processing that corresponds to the image group of a selected reproduction option is performed. Steps S206 and S207 show an example thereof, and show processing performed when the selected image group is a slide show group. In step S206, if the reproduction option selected (designated) in step S203 by the user is the option 704 ("slide show group[101]") or the option 706 ("slide show group[103]") (Yes in step S206), the processing moves to step S207. On the other hand, if the reproduction option selected (designated) by the user is the option 705 ("favorite group[102]") (No in step S206), the processing moves to step S208.

In step S207, the information processing apparatus 100 performs slide show display processing for the selected slide show group. Specifically, the metadata processing unit 106 sequentially acquires the item IDs of the images to be reproduced in a slide show, from the SlideshowEntityToGroupBox 817 (slid) in the GroupListBox 816 (grpl) of the selected slide show group. Then, the metadata processing unit 106 sequentially acquires the image data and associated metadata that correspond to the acquired image items. Note that the present processing is the same processing as that in step S205, except for sequentially acquiring listed item_ids from the SlideshowEntityToGroupBox, instead of acquiring an item_id from the PrimaryItemBox. Then, the display unit 107 sequentially displays the images in the slide show group based on reproduction conditions determined through the application processing executed by the CPU 102, and ends the processing.

Note that after the slide show reproduction of the images of the slide show group is complete, the information processing apparatus 100 may execute slide show reproduction of the selected slide show group again, or may end the reproduction. Alternatively, the processing from steps S204 onwards may be executed again. A configuration is also possible in which an application performs determination and reproduction even when a plurality of image group options are selected. Also, if a plurality of files are selected, the processing may move to processing for the next file. Alternatively, processing determined based on the settings of an application or the information processing apparatus 100, or the like may be executed. For example, conceivable configurations include a configuration in which after the completion of the slide show reproduction, the primary image, which is the representative image, is displayed, and a configuration in which reproduction is started from the selected image group, and all of the options are reproduced sequentially in predetermined processing according to an image and image groups.

In step S208, the information processing apparatus 100 performs reproduction processing that corresponds to the selected image group. In the example shown in FIG. 7, the information processing apparatus 100 performs reproduction processing when the option 705 ("favorite group[102]") is selected by the user. The metadata processing unit 106 sequentially acquires item IDs of the images stored in the Favorite Collection entity group 'favc' in the GroupListBox 816 (grpl) of the selected favorite group. Subsequently, the metadata processing unit 106 sequentially acquire the image data and associated metadata that correspond to the acquired image items. Note that the present processing is the same processing as that in step S205, except for acquiring corresponding item_ids from the FavoriteCollectionEntityToGroupBox, instead of acquiring an item_id from the PrimaryItemBox. Then, the display unit 107 displays the images in a list. Alternatively, the display unit 107 may display the images in accordance with a method for displaying images of the favorite group that is determined by an application processing executed by the CPU 102. For example, the display unit 107 may also display thumbnails of all of the images stored in the favorite group in a list, or may display all of the images configured as grids. Alternatively, the display unit 107 may also perform various types of display determined by an application so that a plurality of images can be displayed in a list, including display of all of the images such that they can be scrolled and reproduced, and display of all of the images as image icons of a suitable size in a list. Also, the display unit 107 may not only perform display in a list but also perform display such that images are switched in the order, for example, listed in a group with a predetermined user operation.

Note that in the present embodiment, the pieces of image group display processing other than reproduction of a slide show group have been described together as the processing in step S208. Step S208 shows processing for displaying an image group that is stored as an image group, and for which it is necessary to perform display processing corresponding to an individual usage. Accordingly, step S208 may include a separate step like a step for a slide show group, so as to perform the processing. Alternatively, the processing steps may be changed according to the settings of an application that performs display. For example, the image group for which it is necessary to switch display, that is, the image group that is determined in step S202, may be changed based on the settings of an application.

HEIF File Slide Show Reproduction Display Processing

Figure 3:
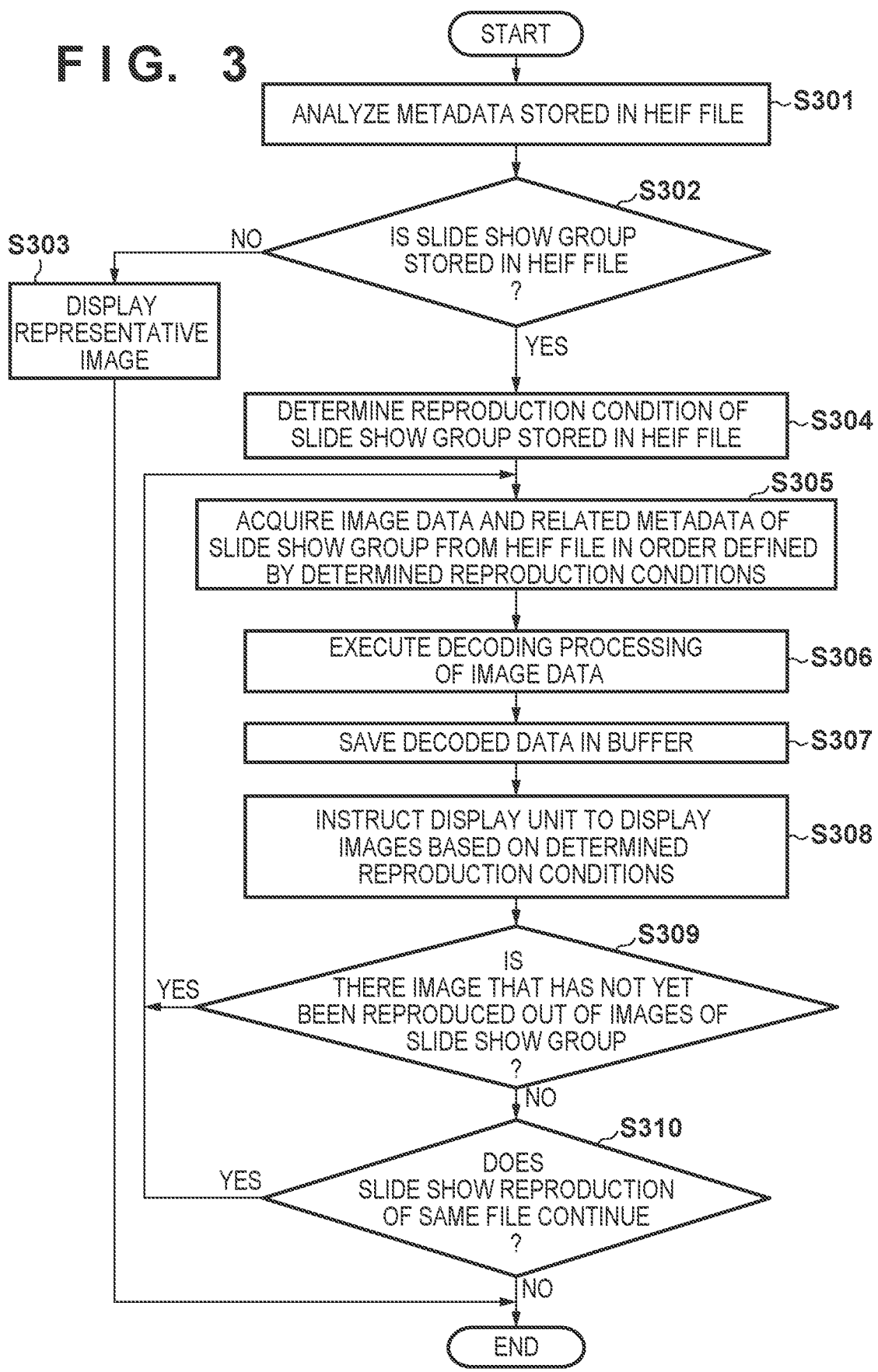
FIG. 3 is a flowchart of slide show reproduction processing for an HEIF file according to one embodiment.

The following will describe slide show reproduction display processing with reference FIG. 3. FIG. 3 shows a flowchart of slide show reproduction display processing of an HEIF file. The present processing may also be executed as a piece of application processing performed by the information processing apparatus 100, or executed by a dedicated slide show reproduction device. This processing flow is a processing flow in which only a slide show group is dealt with as an image group for which it is necessary to switch display, and other image groups are not particularly subjected to identified processing, that is to say, this processing flow is a processing flow specialized for a slide show display application.

In step S301, the metadata processing unit 106 analyzes metadata stored in the selected HEIF file. The metadata structure to be analyzed has a file format with the structure exemplified in FIG. 8. The metadata processing unit 106 reads out metadata stored in the FileTypeBox 801 (ftyp) and the HandlerBox 803 (hdlr) shown in FIG. 8, and analyzes the metadata. It is conceivable that the handler type of MetaDataBox (meta) that is designated for hdlr of the HEIF file to be analyzed is "pict". Subsequently, the metadata processing unit 106 reads out metadata stored in the metadata storage (MetaBox 802 (meta)), and analyzes the metadata. Note that the metadata analyzed here is expanded onto and held by the RAM 103, and is to be used in processing for decoding image data in step S306, together with the coded data stored in the coded data storage area (MediaDataBox 811 (mdat)).

Then, in step S302, the metadata processing unit 106 determines whether or not a slide show group (identification information intended to be used in slide show display) is stored in the HEIF file. As a specific example of the processing, the metadata processing unit 106 analyzes whether or not GroupListBox 816 (grpl) shown in FIG. 8 is stored in the HEIF file. If the GroupListBox 816 (grpl) is stored, the metadata processing unit 106 further analyzes whether or not the SlideshowEntityToGroupBox 817 (slid) is stored in the grpl. If the SlideshowEntityToGroupBox is stored, the metadata processing unit 106 determines that a slide show group is stored in the HEIF file. If a slide show group is not stored in the HEIF file, the processing moves to step S303, and if a slide show group is stored, the processing moves to step S304. Note that in the present embodiment, it is determined whether or not a slide show group is stored, based on whether or not the SlideshowEntityToGroupBox is stored, but it is also possible to perform the determination based on whether or not slide show data is stored as MovieBox (moov). This also includes a case where slide show data is stored using a Derived visual tracks in the ISO base Media file format structure, for which standardization as IEC23001-16 is under review, and a case where slide show data is stored as an image sequence.

If a slide show group is not stored in the HEIF file (No in step S302), the display unit 107 displays, in step S303, the image data (representative image) with an item_id designated by the PrimaryItemBox 804 (pitm) shown in FIG. 8. The following will describe a specific example of the processing in step S303.

First, the metadata processing unit 106 analyzes the type of an image item identified with an item_id designated by the PrimaryItemBox, based on the information indicated by the IteminformationBox 806 (iinf). For example, if "hvc1" is designated, it means that the type of the image item is a HEVC coded image. Subsequently, the metadata processing unit 106 analyzes the ItemReferenceBox 807 (iref) as to whether or not it refers to another item_id, and if the ItemReferenceBox 807 refers to another item_id, the metadata processing unit 106 also analyzes the image item to which it refers. For example, when reference_type is 'dimg', it means that the type of the image item is a derivative image, and the metadata processing unit 106 analyzes and acquires information of the original image from which the image item is derived. Note that this information is not used when there is no reference relationship. Then, the metadata processing unit 106 analyzes the ItemLocationBox 805 (iloc), and acquires the storage location of each image data bit stream in the file. Then, the metadata processing unit 106 specifies the location in the MediaDataBox 811 at which the image data is present, and acquires the corresponding coded data 812 to 815.

Then, by analyzing the metadata, the metadata processing unit 106 acquires the attribute information of the image items. ItemProperty, which indicates attribute information of an image, is stored in the ItemPropertyContainerBox 809 (ipco) in the ItemPropertiesBox 808 (iprp). Also, information indicating the relationship between each image item and attribute information thereof is stored in the ItemPropertyAssociationBox 810 (ipma). Here, the image items are sequentially associated with the attribute information in the ipco. The metadata processing unit 106 acquires the attribute information of the image items by analyzing the metadata. For example, hvcC stored in the ItemPropertyContainerBox (ipco) is attribute information indicating a HEVC coded parameter, and ispe is attribute information indicating the image size. Image data is acquired based on the metadata analyzed by the metadata processing unit 106, and then the coding/decoding unit 105 executes decoding processing on the acquired image data, and generates decoded data. The coding/decoding unit 105 transfers the generated decoded data to the output buffer of the RAM 103, and saves the generated decoded data therein. The CPU 102 instructs the display unit 107 to display the image during display time determined in advance in the information processing apparatus 100. The display unit 107 displays the image in accordance with this instruction. Note that while a prior or previous image is being displayed, the display unit 107 displays that image after the previous display is complete.

If a slide show group is stored in the HEIF file (Yes in step S302), the information processing apparatus 100 executes, in step S304, reproduction condition determination processing on the slide show group (a group of images designated by the identification information intended to be used in slide show display) stored in the HEIF file. The reproduction condition determination processing performed on the slide show group in this processing is to determine conditions, such as the order of reproduction when a plurality of slide show groups are stored, a period of time for which each image is displayed, as to whether or not reproduction is repeated when first reproduction ends, and the order of images to be reproduced.

Then, in step S305, the metadata processing unit 106 acquires image data that corresponds to image items in the slide show group (group of images designated by the identification information intended to be used in slide show display), and related metadata from the HEIF file, in the order defined by the reproduction conditions determined in step S304. Note that the present processing is the same processing as that in step S303, except for acquiring corresponding item_ids from the SlideshowEntityToGroupBox, instead of acquiring an item_id from the PrimaryItemBox in step S303.

In step S306, the coding/decoding unit 105 executes decoding processing based on the metadata and image data acquired in step S305, and generates decoded data. Subsequently, in step S307, the coding/decoding unit 105 transfers the generated decoded data to the output buffer of the RAM 103, and saves the generated decoded data therein. In step S308, the CPU 102 instructs the display unit 107 to display the images based on the reproduction conditions determined in step S304. That is to say, the CPU 102 performs display control for displaying the image group on the display unit 107 based on the reproduction conditions determined in step S304. The display unit 107 displays the images in accordance with the instruction from the CPU 102. Note that while a previous image is being displayed, the display unit 107 displays that image after the previous display is complete.

In step S309, the CPU 102 checks whether or not there is an image that has not yet been reproduced, out of the images of the slide show group that are reproduced in the order defined by the reproduction conditions determined in step S304. If there is an image that has not yet been reproduced, the processing moves to step S305, and the processing from steps S305 onwards is repeated. If there is no image that has not yet been reproduced, the processing moves to step S310, and the CPU 102 determines whether or not to continue the slide show reproduction of the same file. With this processing, it is determined whether or not there is a slide show group that has not yet been reproduced. Alternatively, the determination may also be performed based on the settings of the information processing apparatus 100, or the like. If the slide show reproduction of the same file is to be continued, the processing moves to step S305, and if the slide show reproduction is not to be continued, the processing ends.

The slide show reproduction display processing is executed in the above-described processing flow. Note that although this processing flow shows a flow when a single HEIF file is processed, this processing flow is not limited to processing for HEIF files, and may be applicable to HEIF file reproduction processing that is performed during processing for reproducing a plurality of image files in a slide show. In other words, this processing flow can be a reproduction processing flow that is performed when a plurality of image files are to be reproduced in a slide show, and a HEIF file is included in the plurality of image files. Also, this processing flow can be a processing flow performed when an image group intended to be used in a slide show is included in a HEIF file.

Figure 4:
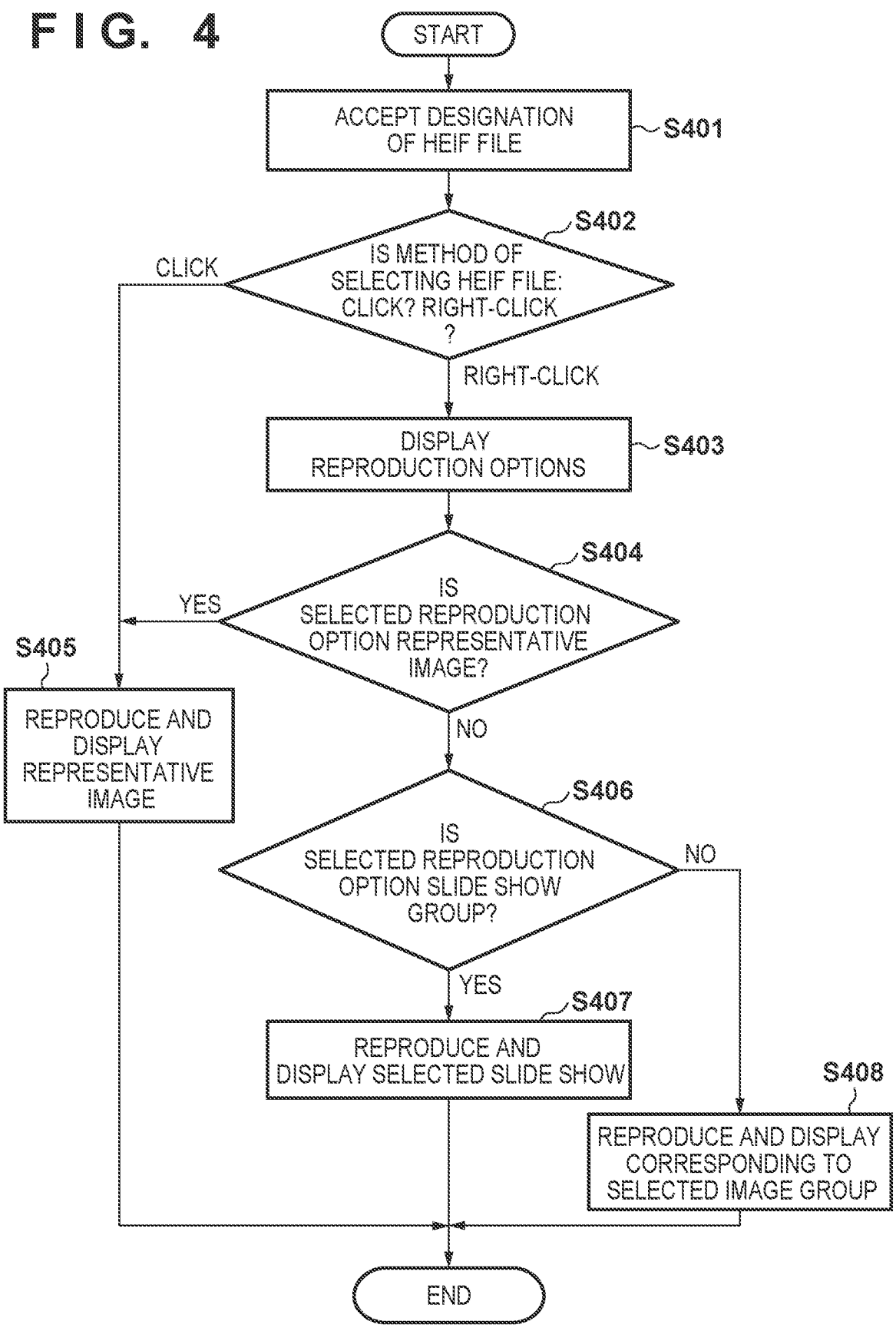
FIG. 4 is a flowchart of image file reproduction processing according to one embodiment.

FIG. 4 shows another example of a flowchart of the image file reproduction display processing. The flow shown in FIG. 4 differs from the flow shown in FIG. 2 in the method for selecting a HEIF file. Specifically, this processing flow is such that if a predetermined selecting operation is performed by a user, a representative image is reproduced and displayed, and if a selecting operation different from the predetermined selecting operation is performed, reproduction options are displayed. Here, a case is assumed in which the predetermined selecting operation is an operation in which, for example, a mouse is used to perform a click operation, whereas the selecting operation different from the predetermined selecting operation is an operation in which, for example, the mouse is used to perform a right-click operation, but the present invention is not limited to this case. For example, in other embodiments, when using a touch panel operation, the click operation may be replaced by a tap operation, and the right-click operation may be replaced by a double-tap operation, a hold operation, or the like. Besides, assignment according to user interfaces can be provided for the branches of step S402. In other words, in the processing flow shown in FIG. 4, the step of HEIF file reproduction processing is changed based on the type of the HEIF file selecting method.

In step S401, the CPU 102 accepts designation of an image file (HEIF file) to be reproduced based on a user instruction given via the user interface unit 108 or the like. This processing is the same as the processing in step S201 shown in FIG. 2. Then, in step S402, the CPU 102 checks the user operation (selecting operation) for selecting a HEIF file given via the user interface unit 108. If the selecting operation is a click operation, the processing moves to step S405, and if the selecting operation is a right-click operation, the processing moves to step S403. The processing flow from step S403 to step S408 is the same as the processing flow from step S203 to step S208 shown in FIG. 2. Note that a configuration is also possible in which the same processing as that in step S202 shown in FIG. 2 is performed before step S403, and the processing moves to step S403 in the case of Yes, and moves to step S405 in the case of No. Note that in step S402, the determination may also be performed based on a condition other than the type of the user operation. For example, if a HEIF file is selected in step S401, a method may also be used in which the CPU 102 instructs the display unit 107 to display a pop-up menu, and prompts the user to select whether a representative image is to be reproduced or slide show reproduction is to be performed. It is also possible to use a method in which the menu screen or the like prompts, for example, a user to select in advance whether a representative image is to be reproduced or slide show reproduction is to be performed, as a display method when a HEIF file is selected.

FIG. 9 shows yet another example of a flowchart of the image file reproduction display processing. This processing flow is a processing flow in which upon a user operation made after the primary image, which is a representative image, has once been displayed, an image group for which it is necessary to switch reproduction display is displayed.

In step S901, the CPU 102 accepts designation of an image file (HEIF file) to be reproduced based on a user instruction given via the user interface unit 108 or the like. This processing is the same as the processing in step S201 shown in FIG. 2. In step S902, the information processing apparatus unit 100 displays the primary image, serving as a representative image, that is stored in the selected HEIF file. This processing is the same as the processing in step S205 shown in FIG. 2. Then, when the CPU 102 detects, in step S903, an operation such as a click that the user made on an image that is being reproduced (displayed) via the user interface unit 108, the processing moves to step S904. In step S904, similar to step S202 shown in FIG. 2, the metadata processing unit 106 analyzes the HEIF file, and determines whether or not an image group for which it is necessary to switch reproduction display is stored. If an image group for which it is necessary to switch reproduction display is stored (Yes in step S904), the processing moves to step S905, and if such an image group is not stored (No in step S904), the processing ends. At this time, the information processing apparatus 100 may continue displaying the primary image that is being displayed, or may end the display of the primary image, that is, the processing for reproducing the selected HEIF file.

In step S905, the CPU 102 causes the display unit 107 to display the image group that serves as a reproduction option. Note that the present processing is the same processing as the processing in step S203 shown in FIG. 2, but the primary image is not displayed as an option. However, there is also no problem when displaying the primary image as an option in this processing, depending on an application or a reproduction processing apparatus.

In step S906, the information processing apparatus 100 performs reproduction display that corresponds to the selected image group, and ends the processing. Note that the display can be ended by processing for ending the image display. If an image group other than the reproduction option displayed in step S905 is selected, the information processing apparatus 100 may display only the representative image. That is to say, the information processing apparatus 100 can operate as having canceled the display processing that corresponds to the image group.

Note that the present embodiment employs a configuration in which an image or an image group to be reproduced is determined by application processing, but a configuration is also possible in which related metadata is described in advance in a file, and a user can determine whether an image group is preferentially displayed, or the first priority image is preferentially displayed. In this case, a conceivable method is such that a dedicated metadata structure is defined and used, or UUID or the like is used to store metadata distinguishable by dedicated application processing. Alternatively, a method is also conceivable in which the provision of the current HEIF standard is changed so that an image group can be designated as a first priority image, and is defined as a standard provision that does not need such determination by an application or the like.

As described above, according to the present embodiment, it is determined whether or not an identifier indicating a first priority image, and group identification information of at least one image that corresponds to a predetermined usage are stored in a metadata storage area in a HEIF file, and if they are stored, it is further determined whether or not the image group is a group for which it is necessary to switch reproduction display. If it is determined that the image group is a group for which it is necessary to switch reproduction display, it is determined whether to display the first priority image or to perform display of the image group that corresponds to the usage of the group, and the determined image or image group is reproduced and displayed. Accordingly, at the time of reproduction and display of a HEIF file, when an image group is stored in the HEIF file, it is possible to determine which one of images or the image group is to be displayed. Also, by determining whether or not reproduction display needs to be switched according to the type of a reproduction device or an application, it is possible to perform determination processing that is specialized for the device or the application.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-099615, filed Jun. 8, 2020, which is hereby incorporated by reference herein in its entirety.

What is claimed is:

1. An information processing apparatus comprising:
one or more processors; and
one or more memories storing instructions that when executed by the one or more processors cause the one or more processors to perform operations comprising:
accepting designation of an image file that conforms to a ISOBMFF (ISO base media file format) standard, the image file including an image data area for storing one or more images and a metadata area for storing metadata information regarding the one or more images, and a first image in the image file that is designated as a representative image for the image file;
determining whether or not any image group, which is designated using a grouping type described in a EntityToGroup Box defined by the ISOBMFF, is stored in the image file for which it is necessary to perform a predetermined display process when displaying is performed of the images in the image group on a display unit;
in accordance with a determination that one or more such image groups are stored in the image file, selecting, either (i) the representative image stored in the image file or (ii) an image group of the determined one or more such image groups stored in the image file, to display on the display unit; and
causing the display unit to display either (i) the selected representative image or (ii) the images included in the selected image group, depending on whether the representative image or an image group is selected by the selecting.

2. The information processing apparatus according to claim 1,
wherein the image file is an image file designated by a user operation.

3. The information processing apparatus according to claim 1,
wherein the predetermined display process is an image switching display process.

4. The information processing apparatus according to claim 1,
wherein the determining determines whether or not one or more such image groups are stored in the image file, based on the metadata.

5. The information processing apparatus according to claim 1,
wherein the determining determines whether or not one or more such image groups are stored, based on settings of the information processing apparatus.

6. The information processing apparatus according to claim 1,
wherein the image file is compliant with HEIF (High Efficiency Image File Format).

7. The information processing apparatus according to claim 1,
wherein the representative image is an image identified with pitm of the metadata.

8. The information processing apparatus according to claim 1,
wherein the one or more such image groups are image groups identified with slid, iaug, favc, albc or ster, which is the grouping type described in the EntityToGroupBox.

9. The information processing apparatus according to claim 1,
wherein the one or more such image groups are image groups identified with a grouping type of the metadata which indicates (1) a slide show, (2) an image and an audio track are associated with each other, (3) a favorite image collection, (4) an album collection or (5) two entities constitute a three-dimensional pair.

10. An information processing apparatus comprising:
one or more processors; and
one or more memories storing instructions that when executed by the one or more processors cause the one or more processors to perform operations comprising:
accepting designation of an image file that conforms to ISOBMFF (ISO base media file format) standard, the image file including an image data area for storing one or more images and a metadata area for storing metadata information regarding the one or more images, and a first image in the image file that is designated as a representative image for the image file,
wherein in a case where the image file is an image file designated by a first predetermined user operation, causing, in a first displaying, a display unit to display the representative image;
in a case where the image file is an image file designated by a second predetermined user operation, determining whether or not any image group, which is designated using a grouping type described in a EntityToGroupBox defined by the ISOBMFF, is stored in the image file for which it is necessary to perform a predetermined display process when displaying is performed of the images in the image group on the display unit;
in accordance with a determination that one or more such image groups are stored in the image file, selecting, either (i) the representative image stored in the image file or (ii) an image group of the determined one or more such image groups stored in the image file, to display on the display unit; and
causing the display unit to display either (i) the selected representative image or (ii) the images in a selected image group, depending on whether the representative image or an image group is selected by the selecting.

11. The information processing apparatus according to claim 10,
wherein the image file stores one or more image groups for which it is necessary to perform a predetermined display process when displaying is performed of the images in the image group on the display unit,
in a case where the image file is an image file designated by the second predetermined user operation, the selecting unit selects the representative image or an image group of the one or more image groups, based on a user operation, and the display control unit causes the display unit to display the selected representative image or images included in the selected image group.

12. The information processing apparatus according to claim 10,
wherein the image file is compliant with HEIF (High Efficiency Image File Format).

13. An information processing apparatus comprising:
one or more processors; and
one or more memories storing instructions that when executed by the one or more processors cause the one or more processors to perform operations comprising:
accepting designation of an image file that conforms to ISOBMFF (ISO base media file format) standard, the image file including an image data area for storing one or more images and a metadata area for storing metadata information regarding the one or more images, and a first image in the image file that is designated as a representative image for the image file;
in a first displaying, causing a display unit to display the representative image;
determining whether or not any image group, which is designated using a grouping type described in a EntityToGroupBox defined by the ISOBMFF, is stored in the image file for which it is necessary to perform a predetermined display process when displaying is performed of the images in the image group on the display unit, upon accepting a predetermined user operation on the representative image that is being displayed on the display unit;
selecting, in accordance with a determination that one or more such image groups are stored in the image file, an image group of the determined one or more image groups based on a user operation; and
causing, in a second displaying, the display unit to display images included in the selected image group.

14. The information processing apparatus according to claim 13,
wherein the image file is compliant with HEIF (High Efficiency Image File Format).

15. The information processing apparatus according to claim 13,
wherein the image file format is HEIF (High Efficiency Image File Format).

16. A control method of an information processing apparatus, the method comprising:
accepting designation of an image file that conforms to a ISOBMFF (ISO base media file format) standard, the image file including an image data area for storing one or more images and a metadata area for storing metadata information regarding the one or more images, and a first image in the image file that is designated as a representative image for the image file;
determining whether or not any image group, which is designated using a grouping type described in a EntityToGroupBox defined by the ISOBMFF, is stored in the image file for which it is necessary to perform a predetermined display process when displaying is performed of the images in the image group on a display unit;
in accordance with a determination that one or more such image groups are stored in the image file, selecting, either (i) the representative image stored in the image file or (ii) an image group of the determined one or more such image groups stored in the image file, to display on the display unit; and
causing the display unit to display either (i) the selected representative image or (ii) to perform displaying of images included in the selected image group, depending on whether the representative image or an image group is selected.

17. A control method of an information processing apparatus, the method comprising:
accepting designation of an image file that conforms to ISOBMFF (ISO base media file format) standard, the image file including an image data area for storing one or more images and a metadata area for storing metadata information regarding the one or more images, and a first image in the image file that is designated as a representative image for the image file;
in a first displaying, causing a display unit to display the representative image;
determining whether or not any image group, which is designated using a grouping type described in a EntityToGroupBox defined by the ISOBMFF, is stored in the image file for which it is necessary to perform a predetermined display process when displaying is performed of the images in the image group on the display unit, upon accepting a predetermined user operation on the representative image that is being displayed on the display unit;
selecting, in accordance with a determination that one or more such image groups are stored in the image file, an image group of the determined one or more image groups based on a user operation; and
causing, in a second displaying, the display unit to perform displaying of images included in the selected image group.

18. A non-transitory computer-readable storage medium storing a computer program for causing a computer to execute a control method of an information processing apparatus, the method comprising:
accepting designation of an image file that conforms to a ISOBMFF (ISO base media file format) standard, the image file including an image data area for storing one or more images and a metadata area for storing metadata information regarding the one or more images, and a first image in the image file that is designated as a representative image for the image file;
determining whether or not any image group, which is designated using a grouping type described in a EntityToGroupBox defined by the ISOBMFF, is stored in the image file for which it is necessary to perform a predetermined display process when displaying is performed of the images in the image group on a display unit;
in accordance with a determination that one or more such image groups are stored in the image file, selecting, either (i) the representative image stored in the image file or (ii) an image group of the determined one or more such image groups stored in the image file, to display on the display unit; and
causing the display unit to display either (i) the selected representative image or (ii) to perform displaying of images included in the selected image group, depending on whether the representative image or an image group is selected.

19. A non-transitory computer-readable storage medium storing a computer program for causing a computer to execute a control method of an information processing apparatus, the method comprising:
accepting designation of an image file that conforms to ISOBMFF (ISO base media file format) standard, the image file including an image data area for storing one or more images and a metadata area for storing metadata information regarding the one or more images, and a first image in the image file that is designated as a representative image for the image file;
in a first displaying, causing a display unit to display the representative image;
determining whether or not any image group, which is designated using a grouping type described in a EntityToGroupBox defined by the ISOBMFF, is stored in the image file for which it is necessary to perform a predetermined display process when displaying is performed of the images in the image group on the display unit, upon accepting a predetermined user operation on the representative image that is being displayed on the display unit;
selecting, in accordance with a determination that one or more such image groups are stored in the image file, an image group of the determined one or more image groups based on a user operation; and
causing, in a second displaying, the display unit to perform displaying of images included in the selected image group.

20. An information processing apparatus comprising:
one or more processors; and
one or more memories storing instructions that when executed by the one or more processors cause the one or more processors to perform operations comprising:
accepting designation of an image file that conforms to a ISOBMFF (ISO base media file format), the image file including an image data area for storing one or more images and a metadata area for storing metadata information regarding the one or more images, and a first image in the image file that is designated as a representative image for the image file;
determining whether or not any image group, which is designated using a grouping type described in a EntityToGroupBox defined by the ISOBMFF, is stored in the image file for which it is necessary to perform a predetermined display process when displaying is performed of the images in the image group on a display unit; and
in accordance with a determination that one or more such image groups are stored in the image file, causing the display unit to display the images included in the image group.

* * * * *